United States Patent
Djerf et al.

(10) Patent No.: US 8,632,644 B2
(45) Date of Patent: Jan. 21, 2014

(54) BAMBOO COMPOSITE TIMBERS

(75) Inventors: Torben Djerf, Grand Saline, TX (US); John D. Eisenhut, Canton, OH (US)

(73) Assignee: TJ Technology Holdings, LLC, Canton, OH (US)

( * ) Notice: Subject to any disclaimer, the term of this patent is extended or adjusted under 35 U.S.C. 154(b) by 398 days.

(21) Appl. No.: 13/050,499

(22) Filed: Mar. 17, 2011

(65) Prior Publication Data
US 2012/0237720 A1    Sep. 20, 2012

(51) Int. Cl.
*B32B 21/13* (2006.01)

(52) U.S. Cl.
USPC .......................................................... 156/60

(58) Field of Classification Search
USPC .......................................................... 156/60
See application file for complete search history.

(56) References Cited

U.S. PATENT DOCUMENTS

| | | | | |
|---|---|---|---|---|
| 3,367,821 A | * | 2/1968 | Keyt et al. | 156/250 |
| 5,747,177 A | * | 5/1998 | Torimoto et al. | 428/537.1 |
| 6,033,754 A | * | 3/2000 | Cooke | 428/106 |
| 6,119,422 A | * | 9/2000 | Clear et al. | 52/309.8 |
| 6,558,765 B2 | * | 5/2003 | Padmanabhan | 428/54 |
| 7,579,063 B2 | * | 8/2009 | Idestrup | 428/106 |
| 8,245,470 B2 | * | 8/2012 | Bathon et al. | 52/309.16 |
| 2008/0016803 A1 | * | 1/2008 | Bathon et al. | 52/223.6 |
| 2008/0152862 A1 | * | 6/2008 | Idestrup | 428/106 |

FOREIGN PATENT DOCUMENTS

CN   101104282 A   *   1/2008
FR   2710674 A1   *   4/1995

OTHER PUBLICATIONS

Philip Proefrock, Lumboo: Dimensional Lumber Made from Bamboo, Jul. 1, 2010, www.Inhabitat.com, http://www.inhabitat.com/lumboo-dimensional-lumber-made-from-bamboo/.*

* cited by examiner

*Primary Examiner* — Daniel McNally
*Assistant Examiner* — Margaret Squalls
(74) *Attorney, Agent, or Firm* — Renner, Kenner, Greive, Bobak, Taylor & Weber Co., L.P.A.

(57) ABSTRACT

A bamboo composite timber and method for making the same is presented. Bamboo slats are laid up into a preform in a mold and coated with a urethane adhesive. The slats are arranged in the preform in side-to-side, end-to-end and face-to-face orientation. The composite is subjected to elevated temperature and pressure in the mold until the adhesive cures, the temperature and pressure ensuring uniformity of the resulting timber and eliminating voids and the like internally. The slats may be arranged in any of numerous ways, including three directions of orthogonal relationships.

10 Claims, 1 Drawing Sheet

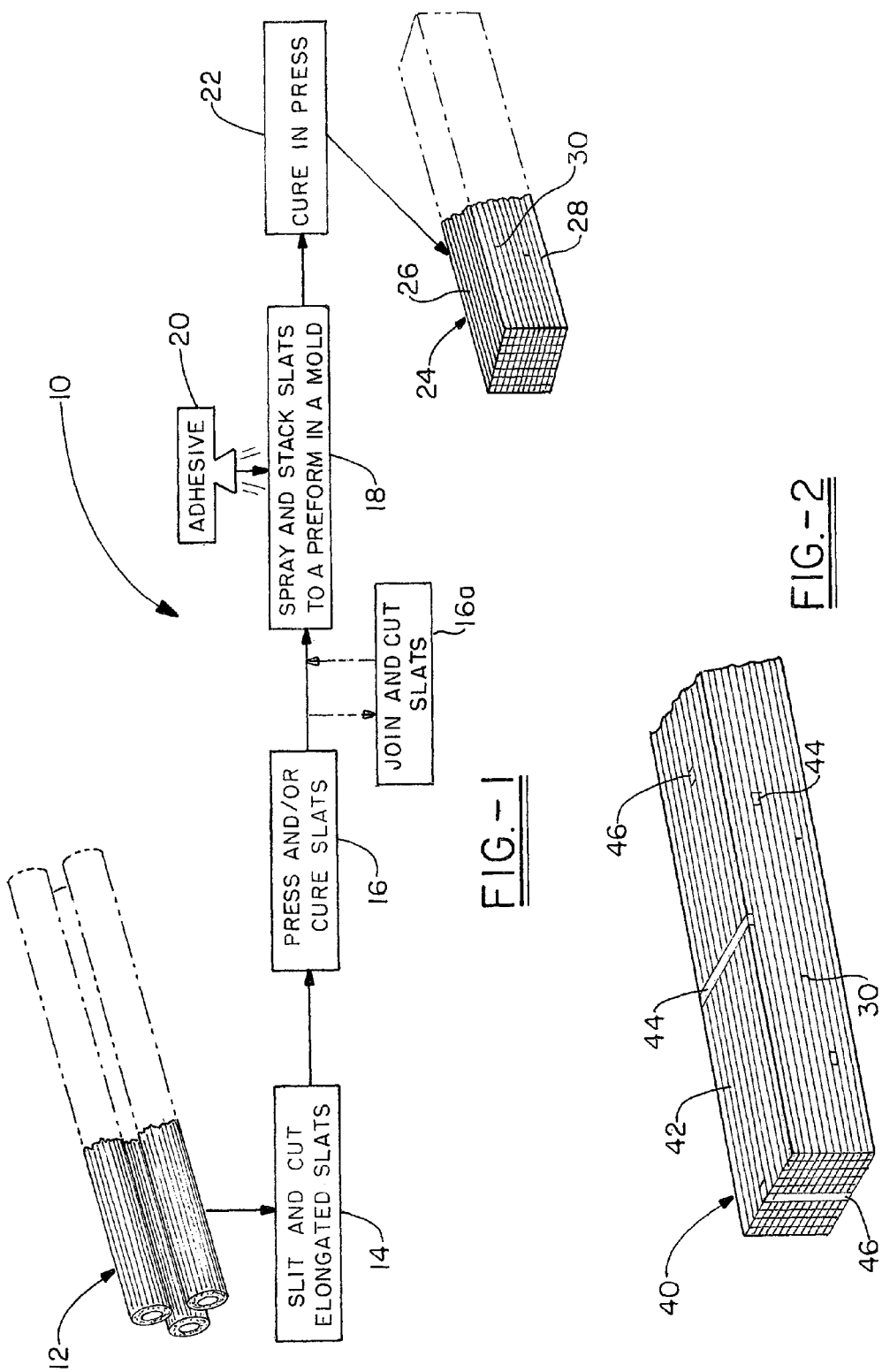

BAMBOO COMPOSITE TIMBERS

TECHNICAL FIELD

The invention herein resides in the art of construction materials and, more particularly, to wooden pieces that are often referred to as timbers. More particularly, the invention relates to composite timbers and specifically to such timbers made from a multitude of adhesively interconnected bamboo slats.

BACKGROUND OF THE INVENTION

The use of wooden pieces of substantial size in a multitude of construction applications is commonplace. These wooden pieces, typically referred to as timbers, are used as building posts, utility poles, mining supports, railroad ties, and the like.

Typically, timbers have comprised solid wood structures that are -pressure treated and/or coated with preservatives and the like to inhibit rot, insect infestation, and similar degradation. Generally, such coatings and pressure treating materials are not environmentally friendly, but include creosote, arsenic and other toxic substances.

Timbers are typically made of hardwoods such as oak and are not only very expensive, but subject to rot, as mentioned above. Typically, hardwoods are slow growing and, accordingly, risk being in short supply, limiting their availability for other uses such as furniture and paneling, while aggravating their cost. While it has been found that more permanent and stronger timbers can be fabricated of reinforced carbon fiber, fiberglass, and similar materials, such fabricated timbers are typically cost prohibitive.

It is most desirable that timbers be capable of being recycled and reused, such that damaged, worn or rotted areas may be removed and replaced or reinforced in any of various manners, such as described in our co-pending patent application Ser. No. 13/013,168, for "Restoring and Recycling Railroad Ties" filed Jan. 25, 2011. It is further desirable to have readily available and cost effective cores for the "Composite Structure for Railroad Ties and Other Structural Members and Method for Their Manufacture" as set forth in our co-pending patent application Ser. No. 12/649,921, filed Dec. 30, 2009.

There is a need in the art for timbers that may be constructed of material from fast growing and readily available sources and that are environmentally friendly while being naturally resistant to rot and environmental degradation. There is a need in the art for such timbers that are at least as strong as existing timbers, and there is a need for such timbers that may be fabricated in a cost effective manner.

DISCLOSURE OF INVENTION

In light of the foregoing, it is a first aspect of the invention to provide the structure and method of making composite timbers adapted for a wide variety of uses.

It is another aspect of the invention to proved the structure and method of making composite timbers that is environmentally friendly.

It is still a further aspect of the invention to provide the structure and method of making composite timbers that are rot resistant without use of undesirable chemicals.

Yet a further aspect of the invention is the provision of a structure and method of making composite timbers that is inexpensive in comparison to existing timbers for similar uses.

Still an additional aspect of the invention is the provision of the structure and method of making composite timbers that have a strength meeting or exceeding existing timbers of oak and other hardwoods.

An additional aspect of the invention is the provision of the structure and method of making composite timbers that are made of rapidly growing and readily available bamboo.

Yet another aspect of the invention is the provision of the structure and method of making composite timbers in which the timbers have a much longer life than previous timbers of hardwood and the like.

Still another aspect of the invention is the provision of the structure and method of making composite timbers that are given to being recycled.

The foregoing and other aspects of the invention that will become apparent as the detailed description proceeds are achieved by a method for making bamboo composite timbers, comprising the steps of: coating a multiplicity of first bamboo slats with an adhesive; arranging said multiplicity of bamboo slats in side-to-side, end-to-end and face-to-face contacting engagement into a timber preform; curing said timber preform in a press; and removing said cured timber preform from said press as a bamboo composite timber.

Other aspects of the invention that will become apparent as the detailed description proceeds are achieved by a bamboo composite timber, comprising: a first plurality of bamboo slats arranged in side-to-side, end-to-end and face-to-face contacting engagement and extending in a first direction; and an adhesive securedly interconnecting said first plurality of the bamboo slats to each other at said contacting engagement.

DESCRIPTION OF DRAWING

For a complete understanding of the various aspects, techniques and structures of the invention, reference should be made to the following detailed description and accompanying drawing wherein:

FIG. 1 is a flow diagram of the process of the invention; and
FIG. 2 is a perspective view of a timber made in accordance with an embodiment of the invention.

BEST MODE FOR CARRYING OUT THE INVENTION

Referring now to the drawing and more particularly to FIG. 1, it can be seen that a process for manufacturing bamboo composite timbers is designated generally by the numeral 10. According to the process 10, an assortment of bamboo shafts 12 are cut and slit as at 14 by appropriate means now well know in the art. The pieces slit and cut from the assortment of bamboo shafts 12 are introduced into an appropriate press 16 where they are pressed and cured, again in somewhat standard fashion. The resulting slats typically have a thickness on the order of ⅛ inch, falling in a range that is typically 0.08-0.25 inch. These slats will have a width ranging on the order of 0.7-2.0 inch, and preferably on the order of about 1 inch in width. The length of the slat will vary, and the slats may be cut to desired lengths for specific applications, such as for use in a long utility pole or a much shorter railroad tie. Lengths on the order of 12 foot are common in the slat manufacturing process at 14, 16. It will be appreciated the invention also contemplates that the slats may be premanufactured and obtained from any of various sources for the uses contemplated hererin.

The cured slats from the curing press 16, or otherwise obtained as finished slats, are often of varying lengths, and seldom of a length sufficient for the manufacture of long timbers such as utility poles. Accordingly, elongated slats may be made, if needed, in the joining and cutting operation 16a. There slats of a shorter than required length are butted together and adhesively attached to each other as by a band of plastic mesh carrying a pressure sensitive adhesive that provides a secure temporary joinder of the abutted slats. The joined slats are then cut to length as by a laser saw for further processing as below.

The slats, whether from premanufacture, the press and cure cycle 16, or the joining and cutting operation 16a, are next stacked in a mold as at 18 to establish a preform of the desired timber. The slats are sprayed with an appropriate adhesive, such as a urethane adhesive, as by use of a spray nozzle 20. It is most desired that the slats be fully coated on all surfaces with the adhesive and such spraying may take place either as the preform is being laid up, or under high pressure after the preform has been made.

As will become more apparent later, it should be appreciated that the timber preform is laid up from a multitude of slats, which may be of varying lengths. These slats are laid up in side-to-side, end-to-end and face-to-face contacting engagement. Care must typically be taken to ensure that any abutting slats in end-to-end engagement are offset from similar engagement of other slats to avoid the development of a weak area or zone in the resulting timber. Otherwise, the laying up of the slats to form the preform can follow any of numerous patterns.

Once the preform has been laid up in the mold, the mold is closed and the curing process takes place at 22. The curing is effected by the application of elevated temperature and pressure within the mold. This process ensures curing of the bonding adhesive, eliminates void areas, and ensures uniformity of the external dimension as well as the internal composite. Of course, it will be appreciated that the band of adhesive coated plastic mesh of the operation 16a and the adhesive employed in the curing process 18 must be compatible.

The process of the invention contemplates the manufacture of timbers of various cross sections, and most prominently round or rectangular. Particularly, in the formation of timbers of a round cross section, the preform may be drawn to a round configuration by a banding operation as in our aforementioned application Ser. No. 13/013,168. Polypropylene or fiber-reinforced urethane bands may be used to draw the layed-up preform into a round cross section after they are stacked in the mold at 18. In the molding process at 22, a pressurized liquid polymer such as urethane may be injected to fully encase the preform and fuse the preform and banding together to form a coated timber that is sealed as in our co-pending application mentioned directly above.

When the curing cycle is completed at 22, a finished timber 24 is removed from the press and appropriately stored, shipped, or put to future use. As can be seen in FIG. 1, the finished timber comprises a plurality of slats 26 glued together at their interfaces as at 28 and at their butted ends 30, with the butt joints 30 being staggered or spaced longitudinally to avoid weak areas in the timber. The resulting finished timber 24 is of a somewhat rudimentary nature consistent with the process of the invention, being manufactured of only longitudinally extending slates that are adhesively bonded together. With reference now to FIG. 2, an alternate embodiment of the timber of the invention can be seen as designated by the numeral 40. Here, there are three sets of slats 42, 44, 46 extending orthogonally to each other. The longitudinal slats 42 extend lengthwise of the timber, the transverse slats 44 extend width wise of the timber and orthogonal to the slats 42, and the slats 46 extend depth wise of the timber, orthogonal to both the longitudinal slats 42 and transverse slats 44.

It will be appreciated that the slats 42, 44, 46 have an inherent grain or fiber that extends longitudinally of the growth of the bamboo itself. The slats are formed such that the grain extends lengthwise of each of the slats. Accordingly, the timber 40 is manufactured of slats having grain extending in each of three orthogonal directions, providing improved and enhanced strength in each of the "x," "y," and "z" directions of the composite timber 40.

Since bamboo is a very rapidly growing tree-like structure, there is a bountiful supply for manufacturing the timbers 24, 40, and others consistent with the concepts of the invention described herein, without fear of depletion of the natural source of the structural material. Bamboo is inherently resistant to rot and other types of environmental impact. Bamboo is inexpensive, readily conducive to the manufacture of slats of a flat uniform nature, and of a strength greater than oak and more on the order of reinforced carbon fiber and fiberglass.

The use of timbers and their process of manufacture as advanced herein can significantly cut the cost of previously employed timbers and extend their useful life. Indeed, the bamboo composite timbers of the invention are readily conducive to recycling and reuse as necessary.

Thus it can be seen that the aspects of the invention have been satisfied by the structure and process presented and described above. While in accordance with the patent statutes only the best mode and preferred embodiments of the invention have been presented and described in detail, the invention is not limited thereto or thereby. Accordingly, for an appreciation of the true scope and breadth of the invention reference should be made to the following claims.

What is claimed is:

1. A method for making bamboo composite timbers, comprising the steps of:
   coating a multiplicity of first bamboo slats with an adhesive;
   arranging said multiplicity of bamboo slats in side-to-side, end-to-end and face-to-face contacting engagement into a timber preform;
   curing said timber preform in a press; and
   removing said cured timber preform from said press as a bamboo composite timber;
   wherein said end-to-end contacting engagements of slats are offset from each other along a length of said preform; and wherein said end-to-end contacting engagements of said slats is achieved by the application of an adhesive coated plastic mesh securing said end-to-end contacting engagement of said slats.

2. The method for making bamboo composite timbers according to claim 1, wherein said step of coating employs a spray of urethane adhesive.

3. The method for making bamboo composite timbers according to claim 1, wherein said first bamboo slats have a grain extending in a length direction of said slats, said length direction corresponding to a length direction of said timber preform.

4. The method for making bamboo composite timbers according to claim 3, wherein said step of arranging further comprises the step of placing second bamboo slats transverse to said first bamboo slats at selected locations along a length of said timber preform.

5. The method for making bamboo composite timbers according to claim 4, wherein said second bamboo slats have a grain extending along a length thereof and transverse to said grain of said first bamboo slats.

6. The method for making bamboo composite timbers according to claim 5, wherein said step of arranging further comprises the step of placing third bamboo slats in a direction orthogonal to the directions of both said first and second slats.

7. The method for making bamboo composite timbers according to claim 6, wherein said third bamboo slats have a grain extending in said direction orthogonal to the direction of both said first and second slats.

8. The method for making bamboo composite timbers according to claim 5, wherein said step of curing comprises exposing said preform timber to an elevated temperature and pressure for a period of time sufficient to cure said adhesive and bond said slats at surfaces of contact with each other.

9. The method for making bamboo composite timbers according to claim 8, wherein said step of arranging said multiplicity of bamboo slats into a timber preform further comprises the step of circumferentially banding said preform into a circular cross section.

10. The method for making bamboo composite timbers according to claim 9, wherein said step of curing said timber preform in a press further comprises the step of injecting a pressurized liquid polymer into said press immediately prior to curing.

\* \* \* \* \*